United States Patent [19]

Perkins

[11] Patent Number: 5,228,717
[45] Date of Patent: Jul. 20, 1993

[54] WHEEL SUPPORT BRACKET FORMED FROM SHEET METAL

[75] Inventor: David J. Perkins, Ann Arbor, Mich.

[73] Assignee: Chrysler Corporation, Highland Park, Mich.

[21] Appl. No.: 803,922

[22] Filed: Dec. 9, 1991

[51] Int. Cl.$^5$ .................... B60G 3/00; B60G 11/16
[52] U.S. Cl. .................... 280/668; 280/701
[58] Field of Search ............. 280/701, 690, 688, 668, 280/696; 267/33

[56] References Cited

U.S. PATENT DOCUMENTS

| | | | |
|---|---|---|---|
| 4,545,600 | 10/1985 | Muller | 280/668 |
| 4,804,169 | 2/1989 | Hassan | 280/668 |
| 4,807,901 | 2/1989 | Kondo | 280/690 |
| 4,921,156 | 5/1990 | Peck | 29/463 |

FOREIGN PATENT DOCUMENTS

| | | | |
|---|---|---|---|
| 2299982 | 9/1976 | France | 280/668 |
| 2472487 | 7/1983 | France | 280/688 |

Primary Examiner—Tamara L. Graysay
Attorney, Agent, or Firm—Edward P. Barthel

[57] ABSTRACT

Metallic sheet stock is formed to define a one-piece blank with three transverse fold lines providing four panels folded into a light weight generally C-shaped shell-like bracket for supporting a wheel, a pair of control links, a trailing arm and a resiliently telescoping strut of a vehicle rear wheel suspension system.

2 Claims, 4 Drawing Sheets

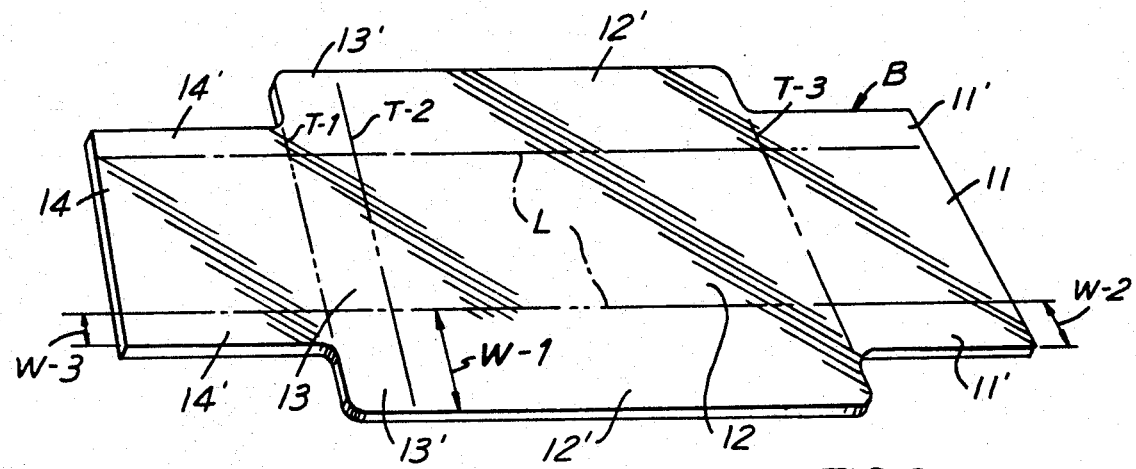
FIG.9
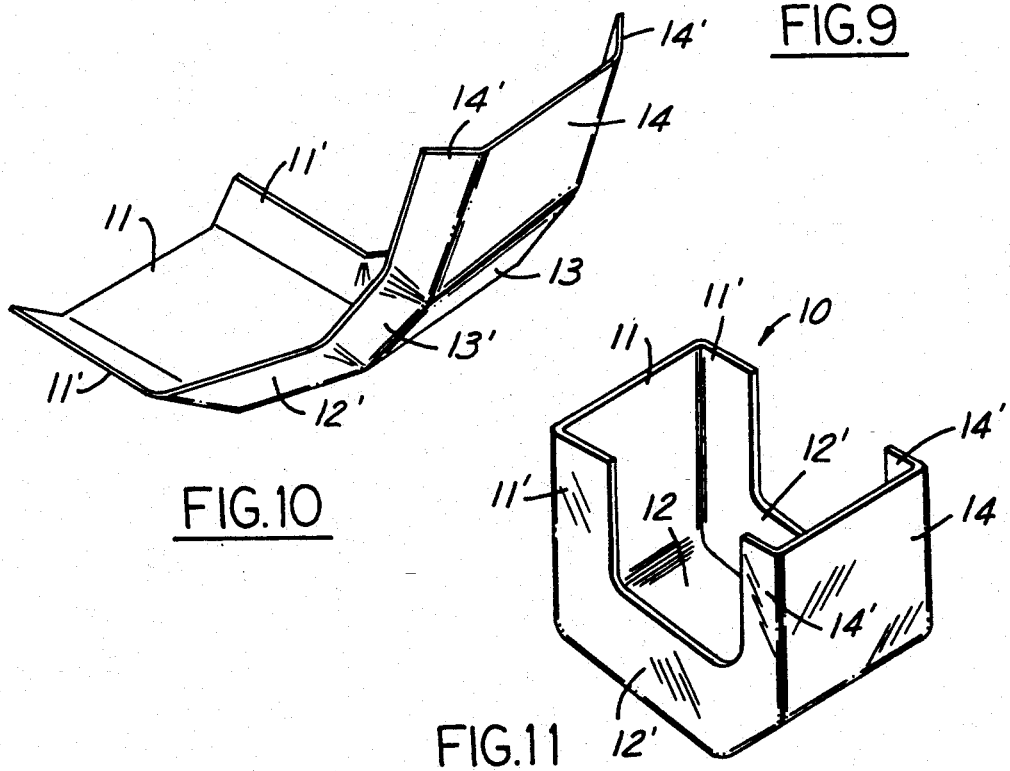
FIG.10
FIG.11

WHEEL SUPPORT BRACKET FORMED FROM SHEET METAL

BACKGROUND OF THE INVENTION

This invention relates to wheel support brackets for automotive vehicles and more particularly to a C-shaped light weight knuckle bracket structure formed from sheet steel.

It is well known in the manufacturing industry to form various articles from blanks cut from suitable flat sheet stock material. The U.S. Pat. No. 4,921,159 issued May 1, 1990 to Peck and entitled Method For Manufacturing A Modified Fast Fade Drive Axle Housing is an example of an automotive component bent or formed from a flat blank of sheet steel material.

Typical automotive strut type suspension systems employ cast or forged metal knuckle wheel support brackets to provide supporting structure for the wheel hub together with longitudinal and lateral control arms. A disadvantage of such cast or forged support brackets is the high mass these parts add to the vehicle unsprung weight.

The U.S. Pat. No. 4,545,600 issued Oct. 8, 1985 to Muller et al. discloses a light weight support mechanism for a strut and wheel spindle of a wheel suspension system. The Muller patent provides a pair of complementary stamping structures for effecting attachment of a telescoping strut, wheel spindle and trailing arm.

SUMMARY OF THE INVENTION

It is an object of the present invention to provide a C-shaped light weight knuckle or wheel support bracket for a vehicle strut type suspension system which is economically formed, such as by stamping, from a flat blank of sheet material.

It is another object of the present invention to provide a C-shaped light weight wheel support bracket as set forth above having a box-like shell section without requiring the use of weld joints.

It is a further object of the present invention to provide a C-shaped light weight wheel support bracket as set forth above which is adapted to support a vertical strut/shock comprising an outer shock cylinder and a telescoping piston rod.

It is still another object of the present invention to provide a C-shaped light weight unitary wheel support bracket for a vehicle strut type suspension system wherein the bracket is formed from a flat blank of sheet metal including means on the bracket for pivotally attaching a trailing arm and a pair of lateral control links.

BRIEF DESCRIPTION OF THE DRAWINGS

These and other objects, features and advantages of the invention will appear from the following written description and the accompanying drawings in which:

FIG. 9 is a perspective view of the flat metal blank used to form the C-shaped knuckle of the present invention;

FIG. 10 is a perspective view of the blank of FIG. 9 as it is partially formed during the first stage of bending; and FIG. 11 is a perspective view of the C-shaped member adapted for fabrication into a wheel supporting knuckle shown in FIGS. 1 and 2.

DETAILED DESCRIPTION OF THE INVENTION

Figure 1:
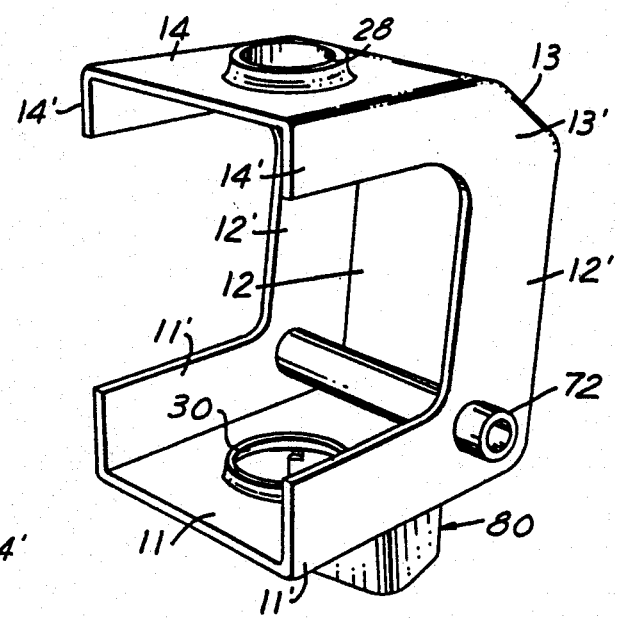
FIG. 1 is a detail inboard perspective view showing a C-shaped vehicle wheel support knuckle of the present invention.
Figure 2:
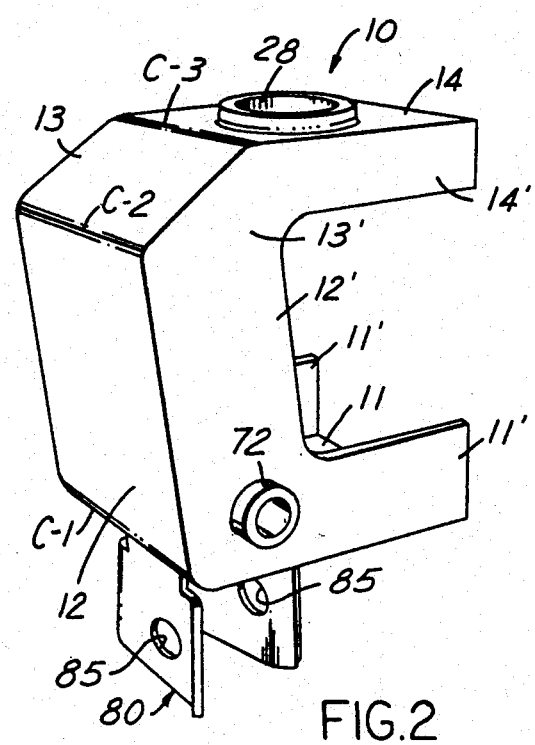
FIG. 2 is a detail outboard perspective view of the c-shaped knuckle of FIG. 1.
Figure 3:
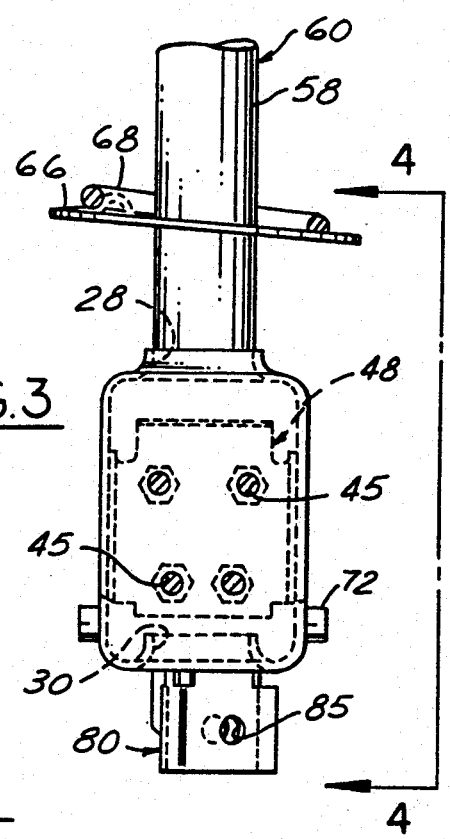
FIG. 3 is a fragmentary side view taken in the direction of the FIG. 3 arrow of FIG. 4.

Referring now to the drawings and in particular to FIGS. 1 and 2 there is shown at 10 perspective detail views of a C-shaped low mass shell-like knuckle or wheel support bracket formed from flat blank stock in accordance with the present invention. The C-shaped bracket 10 is formed from a one-piece flat blank of sheet steel material generally indicated at "B" in FIG. 9. The flat blank "B" comprises a first lower panel 11, a second outboard panel 12, a third beveled inter-connecting panel 13 and a fourth upper panel 14 serially arranged in the order named. The four panels are foldably connected at transverse fold lines "T-1", "T-2" and "T-3" as shown in FIG. 9 are adapted to form three radiused corner junctures "C-1","C-2" and "C-3", respectively, of the formed bracket 10 as seen in FIG. 2.

FIG. 9 shows the blank "B" having each side edge being integrally provided with coextensive mirror image side flange means foldably connected at longitudinal fold lines "L" defining a pair of side flanges for each of the four panels 11-14. Thus, the first panel 11 has an associated pair of side flanges 11', the second panel 12 has an associated pair of side flanges 12', the third panel 13 has an associated pair side flanges 13' and the fourth panel 14 has an associated pair of side flanges 14'. The blank four panels 11-14 have their associated pair of side flanges formed at right angles thereto such that each panel of the C-shaped knuckle bracket is channel shaped in cross-section.

It will be noted in FIG. 9 that each pair of second and third side flanges 12' and 13', respectively, have a common width "W-1" a predetermined dimension greater than the width "W-2" of each pair of side flanges 11'. Further, each pair of side flanges 11' have a common width a predetermined dimension greater than the width "W-3" of each pair of side flanges 14'. Upon the blank "B" being formed into the C-shaped knuckle bracket 10 each pair of the panel side flanges 11', 12', 13' and 14' are folded at right-angles to their associated panel 11, 12, 13 and 14, respectively, wherein each panel is channel-shaped in cross section. It will be noted in FIGS. 1 and 2 that corresponding upper 14' and lower 11' panel side flanges are vertically opposed in common parallel planes which planes also include corresponding inboard extending anchor panel side flanges 12' and 13'.

Figure 4A:
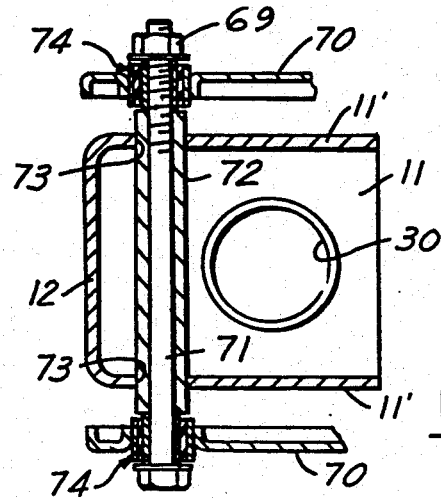
FIG. 4A is a fragmentary horizontal sectional view, partly in elevation, taken on the line 4A—4A of FIG. 4.
Figure 4:
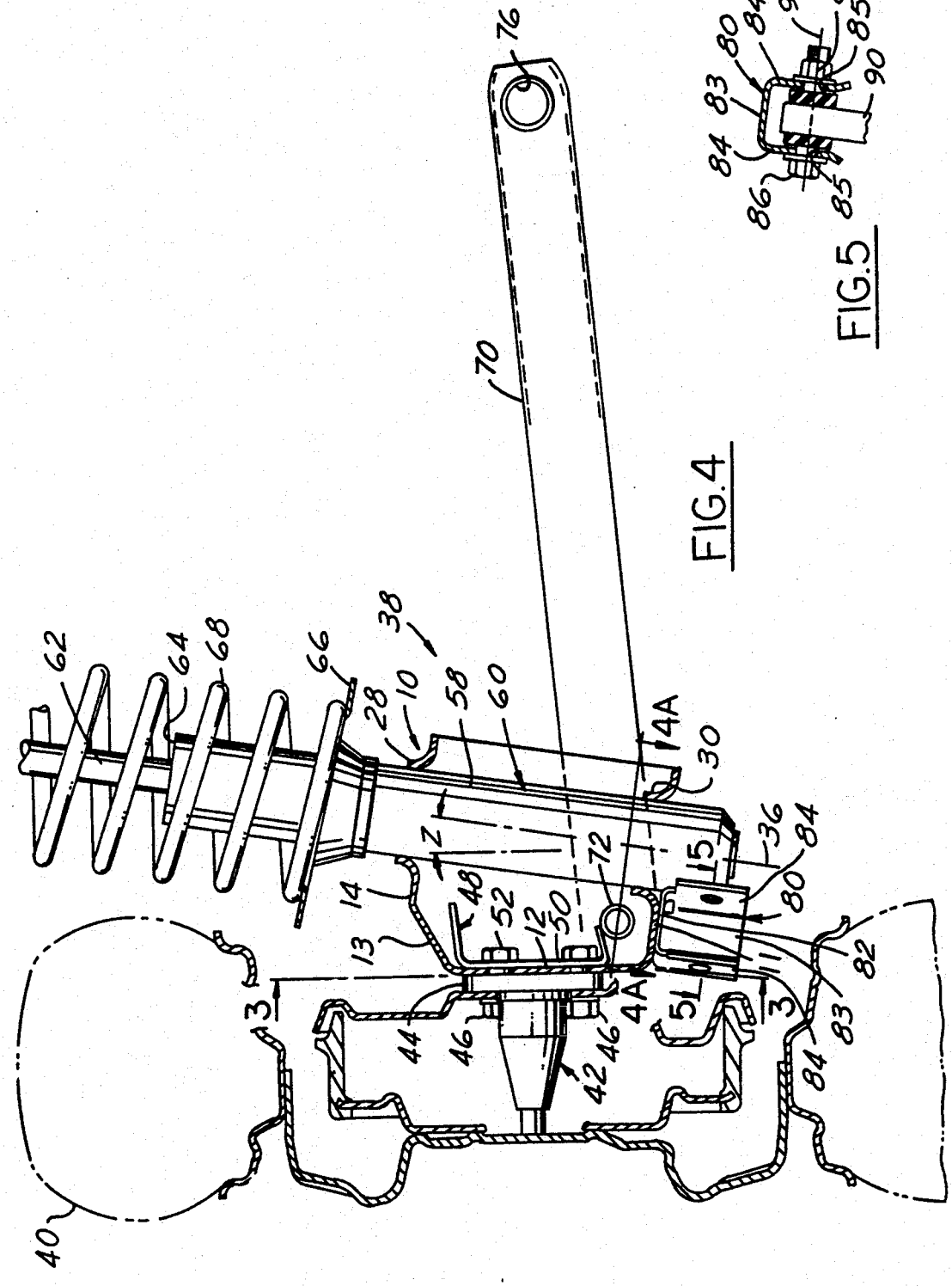
FIG. 4 shows a fragmentary vertical front elevational view, partly in section, of the right-hand half of a vehicle rear wheel mounting structure according to the invention taken on the line 4—4 of FIG. 3.
Figure 7:
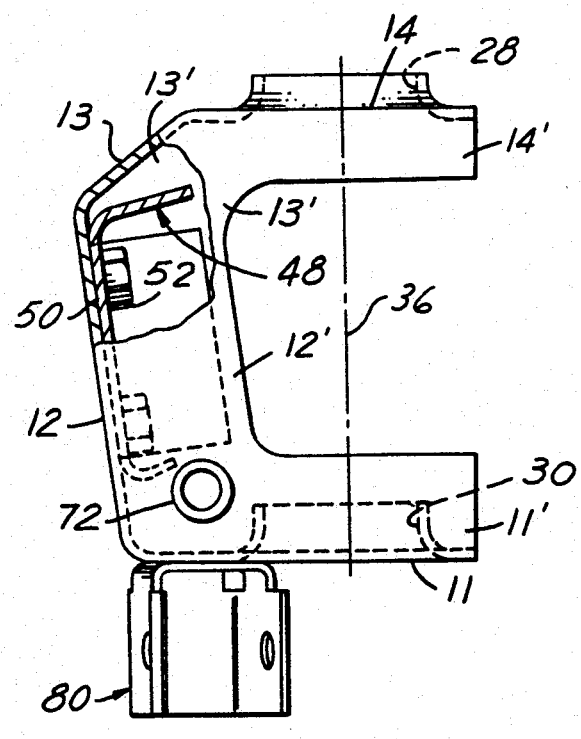
FIG. 7 is an enlarged end elevational detail view, with parts broken away, of the C-shaped knuckle of the present invention.

With reference to FIG. 4 the bracket upper 14 and lower 11 panels are each formed with a central extruded circular aperture 28 and 30, respectively with each of the apertures defined by an upstanding cylindrical flanged-out portion. As best seen in FIG. 7 the upper 28 and the lower 30 extruded apertures have the same diameter and are aligned on a common central axis 36. It will be noted in the rear wheel strut suspension system 38 of FIG. 4 that the outboard anchor panel 12 is disposed in a vertical plane with the lower panel 11 sloped downwardly and inwardly from the anchor panel 12 at a predetermined obtuse angle "X" (FIG. 7) of the order of one hundred (100) degrees. Further, it will be noted that the upper panel 14 is sloped downwardly and inwardly from the interconnecting panel 13 such that the upper panel is parallel with the lower panel 11 while both panels 11 and 14 are normal to the central axis 36.

With reference now to FIG. 4 the suspension system 38 is shown supporting a rear wheel 40 together with longitudinal and lateral control arms on a strut type shock absorber such as might be used in a passenger automobile. The rear wheel 40 has its hub (not shown) rotatably mounted on a wheel spindle member 42 fixed to the C-shaped bracket 10. The two members 42 and 10 are arranged in abutting relationship and define a conventional mounting base for the wheel 40. The bracket vertically disposed outboard anchor panel 12 has its outer surface positioned for flush abutment with mounting flange 44 of the spindle member 42. The outboard panel 12 is provided with a plurality of holes 45 for receiving through-bolts 46 which in the preferred embodiment are four in number.

An internal doubler, generally indicated at 48, comprises a backing plate 50 welded flush with the interior surface of the outboard anchor panel 12 and provided with holes matched to the outboard panel holes. The backing plate 50 interior surface has nuts 52 suitably affixed thereto as by welding with the nuts 52 aligned on the backing plate holes to threadably receive associated through-bolts 46.

As seen in FIG. 4 the bracket upper and lower panel apertures 28 and 30, respectively, are sized to receive outer cylindrical reservoir tube 58 of a MacPherson type suspension strut 60 therein in a close slip or push fit manner. Piston rod 62, which extends axially and upwardly through end cap 64 of the tube 58, has its upper end attached to suitable strut mounting assemblies (not shown) fixed to a vehicle sheet metal tower or the like (not shown). A spring seat 66 centrally secured to the tube 58 is shown supporting the lower end of a helical suspension spring 68 in a conventional manner. Reference may be made to the U.S. Pat. No. 4,804,169 issued Feb. 14, 1989 to Hassen for details of a typical strut piston rod connection. The Hassen patent is incorporated by reference herein.

It will be noted in the suspension system of FIG. 4 that, upon the strut 60 being received in the extruded apertures 28 and 30, the strut principal axis coincides with the bracket's common central axis 36. In this manner the strut principal axis is canted vertically upwardly and inwardly at a predetermined acute angle "Z" of about ten degrees.

FIGS. 4 and 4A illustrate a pair of transversely extending parallel suspension control links 70 having their outboard ends attached to the bracket 10 by means of a pivotal connection. The pivotal connection comprises an anchor bolt 71 surrounded by a longitudinally extending cylindrical support sleeve 72 fixedly mounted, as by welding, in a pair of aligned openings 73 formed in opposed side flanges 12' of the bracket. The anchor bolt 71 has a nut 69 threaded on its one end which clamps a pair of conventional resilient bushings 74 at the fore and aft ends of the support sleeve 72. Thus, the pivot bolt 71 is non-rotatable relative to the fixed support sleeve 72. Each control link 70 has its outboard end apertured to fixedly receive an associated bearing sleeve therethrough so as to be anchored thereto. Each of the bushings 74 have an elastomeric or rubber cylinder bonded to outer and inner concentrically disposed steel sleeves allowing for limited pivotal movement of the links 70 about the axis "A" of the bolt 71.

The opposite ends of the pair of suspension control links 70 are pivotally connected at an aperture 76 to the vehicle body chassis by a suitable bracket structure (not shown). The control link apertures 76 may be co-axial or the links may be of different lengths. It will be noted that the cylindrical sleeve 72 has a length such that it projects a predetermined dimension both fore and aft from its associated side flanges to coaxially support the pair of bushings 74 and the pivot bolt 71 so as to resist both bending and compressive loads.

Figure 5:
FIG. 5 is a fragmentary horizontal sectional view, partly in elevation, taken on the line 5—5 of FIG. 4.
Figure 6:
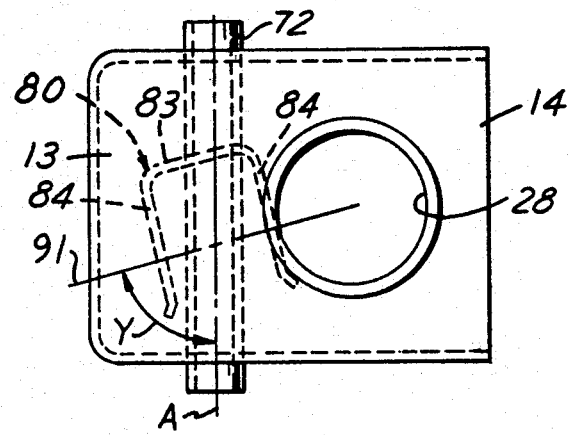
FIG. 6 is an enlarged top elevational detail view of the C-shaped knuckle of the present invention.
Figure 8:
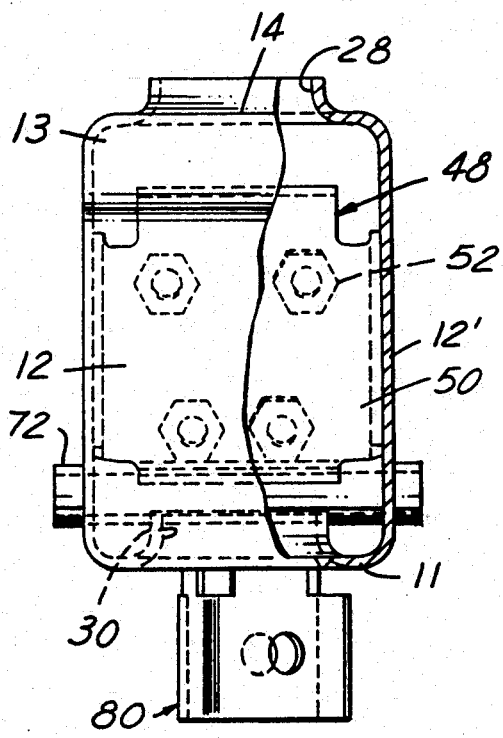
FIG. 8 is an enlarged side elevational detail view, with parts broken away, of the C-shaped knuckle of the present invention.

The wheel support bracket 10 of the present invention further comprises a lower trailing arm attaching a generally U-shaped one-piece carrier stirrup 80 having its bight portion 82 fixed as by welding to the underside of the bracket lower panel 11. As seen in the detail view of FIG. 5 the carrier stirrup 80 has a back wall 83 formed with a pair of normally extending wings 84 provided with aligned holes 85 for receiving a through-bolt 86 and retained by nut 88 for pivotally supporting a suspension trailing or braking arm 90. As best seen in FIG. 6 the stirrup 80 is oriented such that its through-bolt axis of rotation 91 defines a predetermined acute angle "Y" of about eighty degrees with the longitudinally extending pin axis "A". As a result the trailing arm 90 is angled inboard from the longitudinal axis at an acute angle of about ten degrees when viewed in plan. The U.S. Pat. No. 4,807,901 issued Feb. 28, 1989 to Kondo discloses an example of a rear suspension incorporating lateral links and a trailing arm.

FIG. 9 is a perspective view of a generally cross-shaped flat blank "B" of sheet metal material having a preferred outline resembling a cross. The bracket 10 may be suitably press-formed in a series of stages by dies. One method of producing the bracket involves partially bending each series of the blank's side flanges 11', 12', 13', and 14' inwardly toward the other along their associated longitudinal fold lines "L" while also bending the series of panels 11, 12, 13, and 14 along their transverse fold lines "T-1", "T-2", and "T-3" into a partial C-shape as seen in FIG. 11. The simultaneous press-forming procedure is continued until the channeled sectioned C-shaped bracket 10 of FIG. 11 is achieved in a manner disclosed, for example, in the above mentioned U.S. Pat. No. 4,921,159 to Peck.

While the principles of the present invention in connection with the specific test device has been described, it is to be understood the foregoing detailed description has been made by way of example only and not as a limitation to the scope of the invention as set for in the accompanying claims.

What is claimed is:

1. An independent wheel suspension system for a vehicle of the type wherein a strut assembly is interposed between a wheel spindle and a portion of the vehicle body at the wheel, a trailing arm member pivotally mounted to the vehicle chassis rearwardly of the wheel and a pair of lateral control link members pivotally mounted to the vehicle chassis inboard of the wheel, and a wheel support bracket for pivotally supporting the trailing arm and lateral control links, the bracket comprising:

a box-like generally C-shaped wheel support bracket being formed from a one-piece generally cross-shaped flat blank of sheet metal stock presenting a first lower panel, a second anchor panel, a third transition panel and a fourth upper panel serially arranged in the order named and foldably connected at transverse first, second and third fold lines forming three transverse corner junctures of said bracket, the side edges of said blank being integrally provided with coextensive mirror image side flange means and foldably connected at longitudinal fold lines providing a pair of side flanges for each of said panels;

said blank four panels and associated side flanges being formed into said bracket about said longitudinal and transverse fold lines, respectively, wherein said first lower panel is sloped downwardly and inwardly from said second vertically disposed outboard anchor panel about said first fold line at a predetermined obtuse angle, said third transition panel is sloped upwardly and inwardly from said second outboard anchor panel about said second fold line, and said forth upper panel is sloped inwardly and downwardly from said third interconnecting panel so as to be disposed parallel with said first lower panel;

each of said panels having their associated pair of side flanges folded at right-angles thereto wherein each of said four panels is channel-shaped in cross-section such that said upper and lower panel side flanges are in opposed co-planar relation and said outboard anchor panel side flanges extend inboard therefrom;

each said upper and lower panel provided with a central aperture therein aligned on a common upwardly and inwardly sloped central axis, said central apertures sized for the reception therethrough of said strut; and said C-shaped bracket outboard panel provided with a plurality of fastener receiving holes, said outboard panel adapted for mounting a wheel spindle member thereon by fastener means.

2. The wheel support bracket as set forth in claim 1 wherein a pair of said side flanges having longitudinally aligned apertures therein, a cylindrical support sleeve extending through said pair of apertures and fixedly secured to said side flanges, said sleeve of a length such that each free end thereof extends a predetermined dimension beyond its associated side flange, an anchor bolt surrounded by said support sleeve operative to clamp fore and aft resilient bushings on each free end of said support sleeve, each said resilient bushing fixed to an outboard end of a suspension control link permitting rotational movement of said links about the principal axis of said support sleeve.

* * * * *